United States Patent
Kim

(10) Patent No.: US 8,232,974 B2
(45) Date of Patent: Jul. 31, 2012

(54) LIQUID CRYSTAL DISPLAY DEVICE

(75) Inventor: Cheol Se Kim, Daegu-si (KR)

(73) Assignee: LG Display Co., Ltd., Seoul (KR)

( * ) Notice: Subject to any disclaimer, the term of this patent is extended or adjusted under 35 U.S.C. 154(b) by 944 days.

(21) Appl. No.: 12/261,866

(22) Filed: Oct. 30, 2008

(65) Prior Publication Data

US 2009/0256816 A1    Oct. 15, 2009

(30) Foreign Application Priority Data

Apr. 10, 2008 (KR) .......................... 10-2008-033123

(51) Int. Cl.
*G06F 3/041* (2006.01)
*G09G 3/36* (2006.01)
*G09G 3/34* (2006.01)

(52) U.S. Cl. ........................ 345/173; 345/87; 345/107

(58) Field of Classification Search .................... 345/173
See application file for complete search history.

(56) References Cited

U.S. PATENT DOCUMENTS

| | | | |
|---|---|---|---|
| 8,018,428 B2 * | 9/2011 | Jung et al. ............. | 345/107 |
| 2007/0030255 A1 * | 2/2007 | Pak et al. ............. | 345/173 |
| 2007/0109239 A1 * | 5/2007 | den Boer et al. ......... | 345/87 |
| 2007/0176905 A1 * | 8/2007 | Shih et al. ............. | 345/173 |

* cited by examiner

*Primary Examiner* — Alexander S Beck
*Assistant Examiner* — Charles V Hicks
(74) *Attorney, Agent, or Firm* — Brinks Hofer Gilson & Lione

(57) ABSTRACT

The liquid crystal display device is for recognizing a variation in liquid crystal capacitance according to a touch to be capable of sensing whether or not the device is touched and the position of a touched region and includes a first substrate and a second substrate being opposite to each other; a plurality of gate lines and a plurality of data lines crossing each other on the first substrate to define pixel regions; pixel transistors respectively disposed at the intersections of the plurality of gate lines and the plurality of data lines, and pixel electrodes respectively disposed in the pixel regions; a common electrode disposed on the entire surface of the second substrate; a liquid crystal layer filling a gap between the first and second substrates; liquid crystal capacitors between the pixel electrodes and the common electrode; first storage capacitors disposed between the pixel electrodes and first storage electrodes on the first substrate; second storage capacitors and sensing capacitors in series between the gate lines and the common electrode; a read out line being parallel with the data lines; and switching transistors, each of which is provided with a gate electrode connected to a node between the second storage capacitor and the sensing capacitor, a drain electrode connected to the read out line, and a source electrode connected to a power voltage line.

7 Claims, 8 Drawing Sheets

TOUCH SENSING UNIT

TOUCH SENSING UNIT

LIQUID CRYSTAL DISPLAY DEVICE

This application claims the benefit of Korean Patent Application No. 2008-033123, filed on Apr. 10, 2008, which is hereby incorporated by reference as if fully set forth herein.

BACKGROUND OF THE INVENTION

1. Field of the Invention

The present invention relates to a liquid display crystal display device, and more particularly, to a liquid crystal display device, which recognizes a variation in liquid crystal capacitance according to a touch to be capable of sensing whether or not the device is touched and the position of a touched region.

2. Discussion of the Related Art

As the information-oriented age has arrived, the field of displays visually expressing electric data signals has been rapidly grown, and in order to satisfy this growth, various flat display devices having characteristics, such as thin profile, light weight, and low power consumption, have been developed and rapidly replaced a conventional cathode ray tube (CRT).

Specifically, the flat display devices include a liquid crystal display device (LCD), a plasma display panel device (PDP), a field emission display device (FED), an electro luminescence display device (ELD), etc. All the above flat display devices essentially include a flat display panel to display an image. The flat display panel consists of a pair of transparent insulating substrates, which are bonded to each other under the condition that an intrinsic luminescent or polarizing material layer is interposed therebetween.

A liquid crystal display device displays an image by adjusting the light transmittance of liquid crystals using an electric field. Therefore, the liquid crystal display includes a display panel having liquid crystal cells, a backlight unit to irradiate light onto the display panel, and driving circuits to drive the liquid crystal cells.

The display panel is configured such that a plurality of gate lines and a plurality of data lines intersect each other to define a plurality of unit pixel regions. Here, in each of the pixel regions, a thin film transistor array substrate and a color filter substrate, which are opposite to each other, spacers located to maintain a designated cell gap between the two substrates, and liquid crystals filling the cell gap are provided.

The thin film transistor array substrate includes the gate lines and the data lines, thin film transistors serving as switching elements and formed at the intersections of the gate lines and the data lines, pixel electrodes formed as the unit of liquid crystal cells and connected to the thin film transistors, and an alignment layer applied thereto. The gate lines and the data lines respectively receive signals from the driving circuits through their pad parts.

The thin film transistors respond to a scan signal supplied to the gate lines, and thus supply a pixel voltage signal supplied to the data lines to the pixel electrodes.

The color filter array substrate includes color filters formed as the unit of liquid crystal cells, a black matrix to divide the color filters from each other and reflect external light, a common electrode to supply a reference voltage to the liquid crystal cells in common, and an alignment layer applied thereto.

The thin film transistor array substrate and the color filter array substrate, which are separately manufactured, are aligned, and then are bonded to each other. Thereafter, liquid crystals fill a gap between the two substrates and the gap is sealed, thus completing the display panel.

In the liquid crystal display device, manufactured by the above process, a demand for a touch panel, which recognizes the position of a region touched through a hand or a separate input unit and correspondingly transmits a separate data, has been increased. This touch panel is now used in a state, in which the touch panel is attached to the external surface of a liquid crystal display device. Thus, an attempt to install the touch panel within a panel in the liquid crystal display device has been made.

Now, an example of a liquid crystal display device, in which the above touch panel is installed to prevent the increase in volume caused by the attachment of a separate touch panel to the external surface of the liquid crystal display device, will be described.

Hereinafter, a conventional liquid crystal display device will be described with reference to the accompanying drawings.

FIG. 1 is a schematic circuit diagram illustrating a conventional liquid crystal display device, which recognizes a touch in a capacitance method, and FIG. 2 is a circuit diagram illustrating a capacitance sensor of FIG. 1 and a driving method thereof.

As shown in FIGS. 1 and 2, the conventional liquid crystal display device includes first and second substrates (not shown), which are opposite to each other, a liquid crystal layer (not shown) filling a gap between the first and second substrates, gate lines 11 and data lines 12, which intersect each other on the first substrate to define pixel regions, and thin film transistors (TFTs) formed at the intersections of the gate lines 11 and the data lines 12. A common electrode (not shown, voltage (Vcom)) is formed on the entire surface of the second substrate, and pixel electrodes 13 are respectively formed on the pixel regions on the first substrate.

Here, in order to sense capacitance, a first line 21 located in parallel with the gate lines 11 and a second line 22 located in parallel with the data lines 12 are formed at the outside of the pixel regions, and a first reference voltage line (Vref1) and a second reference voltage line (Vref2) respectively in parallel with the first line 21 and the second line 22 are further formed.

Further, first auxiliary capacitors (Cref1) are formed between the first reference voltage line (Vref1) and the first line 21, and first liquid crystal capacitors (Clc1) are formed between the first line 21 and the common electrode (Vcom). In this case, the first auxiliary capacitors (Cref1) and the first liquid crystal capacitors (Clc1) are formed in series. The first auxiliary capacitors (Cref1) and the first liquid crystal capacitors (Clc1), which are connected in series, are respectively formed in pixels.

In the same manner, second auxiliary capacitors (Cref2) are formed between the second reference voltage line (Vref2) and the second line 22, and second liquid crystal capacitors (Clc2) are formed between the common electrode (Vcom) and the second line 22. The second auxiliary capacitors (Cref2) and the second liquid crystal capacitors (Clc2) are connected in series also.

Here, an amplifier 31 is provided at the end of the first line 21, as shown in FIG. 2, and thus a signal sensed by the first line 21 obtains a value amplified from voltage applied to each of nodes (Vn1) between the respective auxiliary capacitors (Cref) 33 and the respective liquid crystal capacitors (Clc) 32, and whether or not the device is touched and the position of a touched region are determined by the above value. That is, the voltage value of the liquid crystal capacitor (Clc) 32 is varied according to whether or not the device is touched, and in case that the voltage value outputted from the node (Vn1) through the amplifier 31 differs from the initial voltage value of the liquid crystal capacitor (Clc) 32, it is determined that the liquid crystal display device is touched, and correspondingly the position of a touched region is sensed.

Further, first and second switches (sw1 and sw2) are provided at the opposite side to the output side of the node (Vn1) between the auxiliary capacitor (Cref) 33 and the liquid crystal capacitor (Clc) 32, and signals are selectively applied through the first and second switches (sw1 and sw2).

Two common voltage values (Vcomh and VcomI) are alternately applied to the first and second reference voltage lines (Vref1 and Vref2) connected to sides of the first and second auxiliary capacitors (Cref1 and Cref2) 33. Voltage (Va) is applied through the first switch (sw1) and stored in the liquid crystal capacitor (Clc) 32, when the common voltage has the value (Vcom), and then is outputted to the amplifier 31, when the common voltage has the value (VcomI). Consequently, the outputted voltage contains data of the value of the liquid crystal capacitor (Clc) 32, which is varied when touched. A variation in output voltage according to a variation in capacitance is as follows.

$$\frac{\partial V_{n1}}{\partial C_{LC}} = -\frac{C_{ref}}{(C_{ref} + C_{LC})^2} \cdot (V_{comH} - V_{comL})$$

In this constitution, lines disposed on the X-axis and the Y-axis, which intersect each other, are required, and thus an increase in parasitic capacitance is expected.

The above conventional liquid crystal display device, which recognizes a touch in a capacitance method, has several problems, as follows.

First, a variation in voltage at a point corresponding to one pixel is selectively sensed to detect whether or not the pixel is touched, and thus when several points are touched, it is impossible to recognize whether or not several pixels corresponding to the points are touched.

Second, lines intersecting each other are formed to sense positions of a touched point on the X-axis and the Y-axis to sense a touch, an increase in size of the panel is expected, line resistance of the lines and parasitic capacitance are increased due to the increase in size of the panel, and coupling capacitance is increased and thus a signal to noise (S/N) ratio is decreased. Thereby, the reliability of a signal may be lowered, and thus it may be difficult to recognize the touch.

SUMMARY OF THE INVENTION

A liquid crystal display device includes a first substrate and a second substrate being opposite to each other; a plurality of gate lines and a plurality of data lines crossing each other on the first substrate to define pixel regions; pixel transistors respectively formed at the intersections of the plurality of gate lines and the plurality of data lines, and pixel electrodes respectively formed in the pixel regions; a common electrode formed on the entire surface of the second substrate; a liquid crystal layer filling a gap between the first and second substrates; liquid crystal capacitors between the pixel electrodes and the common electrode; first storage capacitors formed between the pixel electrodes and first storage electrodes on the first substrate; second storage capacitors and sensing capacitors formed in series between the gate lines and the common electrode; a read out line being parallel with the data lines; and switching transistors, each of which is provided with a gate electrode connected to a node between the second storage capacitor and the sensing capacitor, a drain electrode connected to the read out line, and a source electrode connected to a power voltage line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, with reference with the accompanying drawings, a liquid crystal display device in accordance with the present invention and a touch sensing method thereof will be described in detail.

Figure 1:
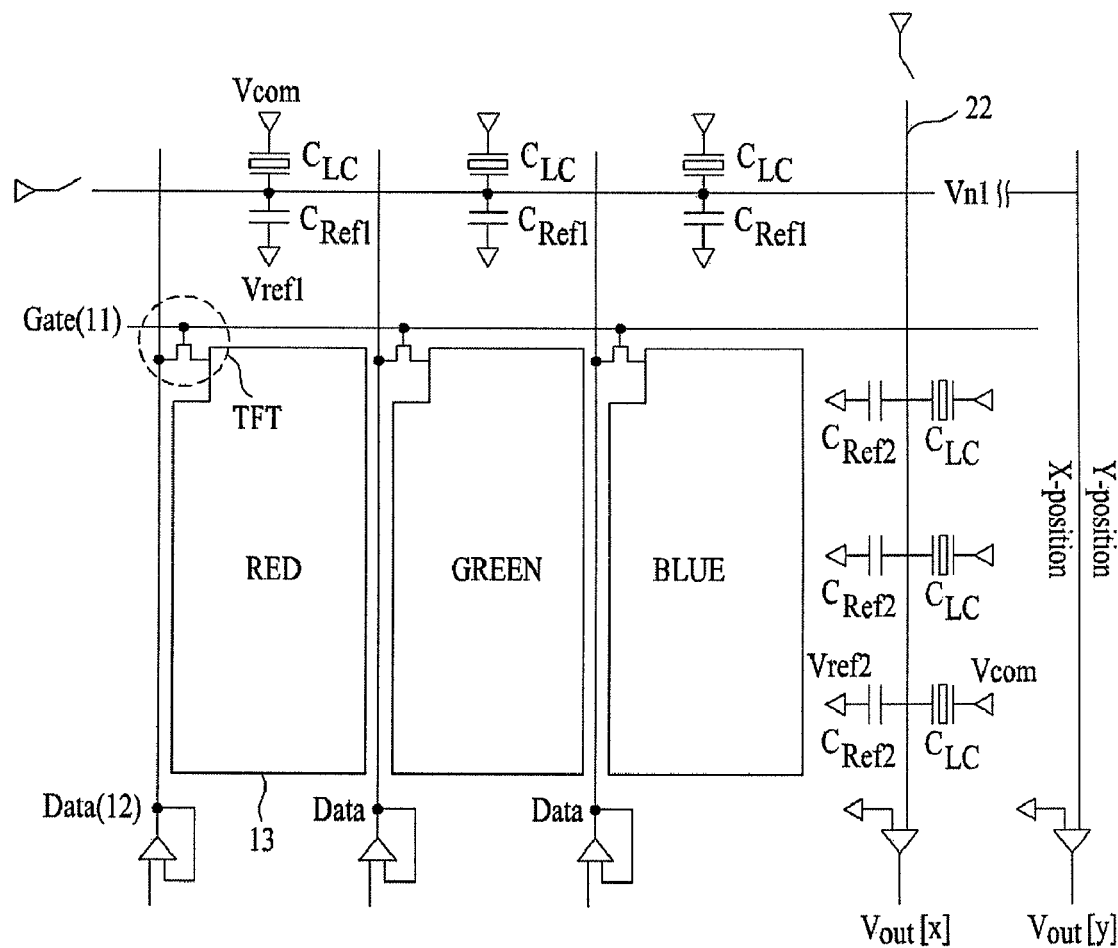
FIG. 1 is a schematic circuit diagram illustrating a conventional liquid crystal display device, which recognizes a touch in a capacitance method.
Figure 2:
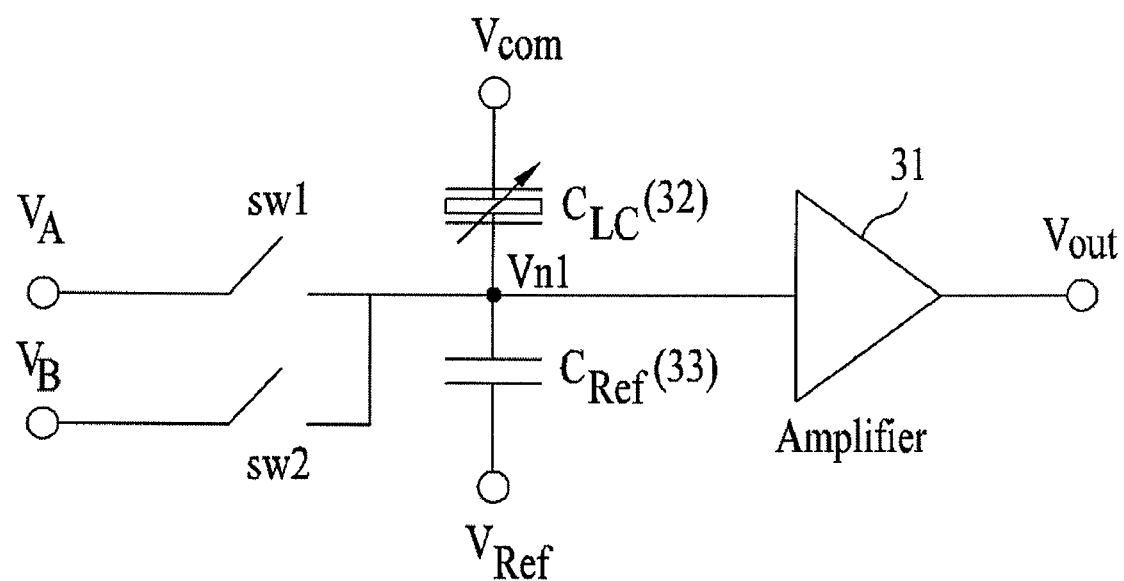
FIG. 2 is a circuit diagram illustrating a capacitance sensor of FIG. 1 and a driving method thereof.
Figure 3:
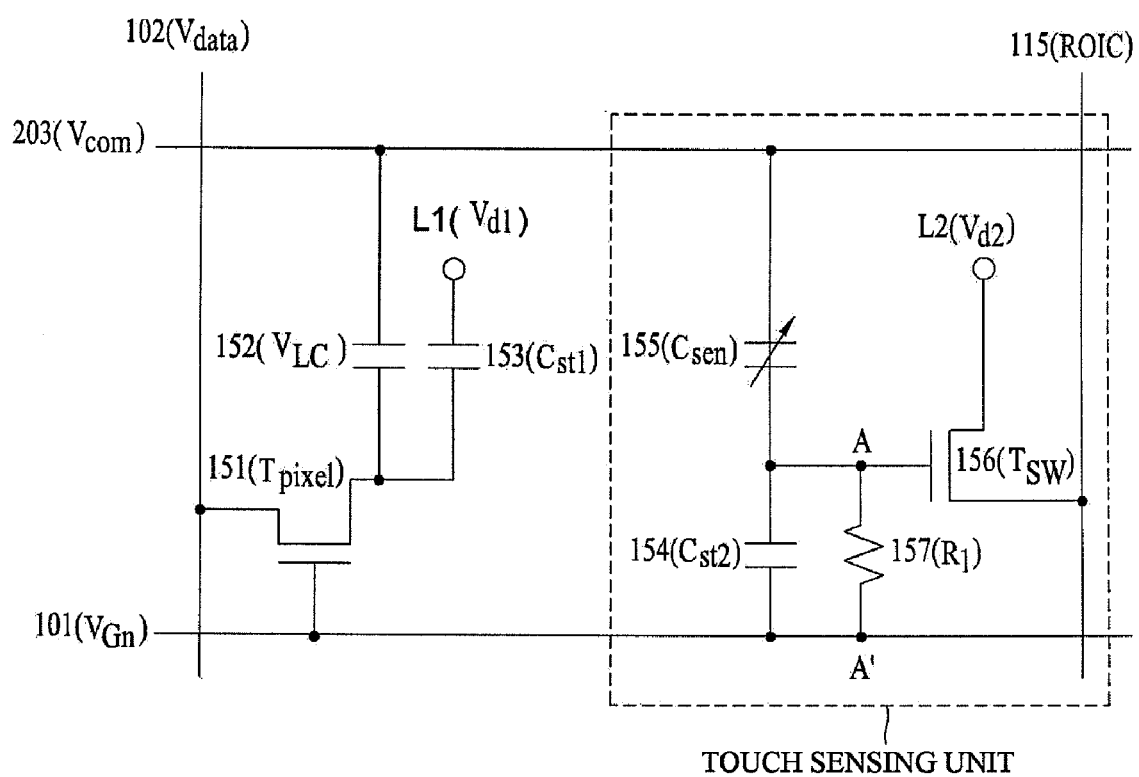
FIG. 3 is a circuit diagram illustrating a liquid crystal display device in accordance with an embodiment of the present invention.

FIG. 3 is a circuit diagram illustrating a liquid crystal display device in accordance with an embodiment of the present invention.

As shown in FIG. 3, the liquid crystal display device of the present invention includes first and second substrates 100 and 200 (with reference to FIGS. 4 to 7), which are opposite to each other to sense a touch, a liquid crystal layer filling a gap between the first and second substrate, a thin film transistor array formed on the first substrate 100, and a color filter array formed on the second substrate 200.

Here, the color filter array includes a black matrix layer 201 (with reference to FIG. 6) formed in non-pixel regions, a color filter layer 202 (with reference to FIG. 6) determining colors of respective pixel regions, and a common electrode 203 (with reference to FIG. 6) formed on the entire surface of the second substrate 200.

The thin film transistor array includes gate lines 101 and data lines 102, which intersect each other on the first substrate 100 (with reference to FIGS. 5 and 6) to define the pixel regions, pixel transistors (Tpixel) 151 formed at the intersections of the gate lines 101 and the data lines 102, and liquid crystal capacitors (Clc) 152 and first storage capacitors (Cst1) 153, which are connected in parallel between drain terminals of the pixel transistors (Tpixel) 151 and the common electrode 203. Although the liquid crystal capacitor (Clc) 152 and the first storage capacitor (Cst1) 153 are connected in parallel on the circuit, the liquid crystal capacitor (Clc) 152 is substantially formed among the common electrode 203, the drain terminal of the pixel transistor (Tpixel) 151, and the liquid crystal layer formed therebetween, and the first storage capacitor (Cst1) 153 is substantially formed between the drain terminal of the pixel transistors (Tpixel) 151 and a first voltage line (L1). Here, the first voltage line L1 may be separately formed, or use the common electrode (Cm) or a previous gate line (Gn-1) to optimize the structure of the liquid crystal display device.

Further, in the liquid crystal display device of the present invention, touch sensing units are further formed between the gate lines (Gn) 101 and the common electrode 203, in addition to the pixel thin film transistors (Tpixel) 151 to drive pixels and the liquid crystal capacitors (Clc) 152 and the first storage capacitors (Cst1) 153 connected thereto, which are formed between the gate lines (Gn) 101 and the common electrode 203.

Here, each of the touch sensing units includes a second storage capacitor (Cst2) 154 and a sensing capacitor (Csen) 155 connected in series between the gate line (Gn) 101 and the common electrode 203, and a switching transistor (Tsw) 156 provided with a gate electrode connected to a node A between the second storage capacitor (Cst2) 154 and the sensing capacitor (Csen) 155, a drain electrode connected to a read out line (ROIC) running parallel with the data line (Dm), and a source electrode connected to a second voltage line (L2). Each of the touch sensing units further includes a resistance (R1) 157 formed between the node A and the gate line (Gn) 101 to stabilize a voltage value applied to the gate electrode supplied to the switching transistor (Tsw) 156.

The touch sensing units may be respectively formed in the pixels, or may be periodically formed at intervals of a designated number of the pixels. Here, the positions of the touch sensing units may be determined by the number of the pixels located in the area of one touched region in consideration of the general area of a touched region and the general size of pixels. That is, assuming that the number of the pixels located in the area of one touched region is n, the touch sensing units are periodically formed at intervals of n pixels.

Further, one side electrode of the first storage capacitor (Cst1) 153 may be a pixel electrode and the other side electrode of the first storage capacitor (Cst1) 153 may be the previous gate line (Gn-1) or a common line 106 (with reference to FIG. 5) separately formed in pixel regions running parallel with each other according to the gate lines according to the position of the first storage capacitors (Cst1) 153 formed by overlapping the first voltage line (L1) and the pixel electrode. The second voltage line (L2) serves to apply power voltage. For example, the common lines (having the shape of the lines 106 of FIG. 5 or the shape of a line separately formed at the edge of the first substrate 100) formed on the first substrate 100 may be used as the second voltage line (L2).

The read out line (ROIC) serves to sense current flowing in the switching transistor (Tsw) 156, and an amplifier is provided at one end of the read out line (ROIC) and amplifies the sensed current to improve sensitivity.

Here, the resistance 157 is configured to have a resistance value (R1), which causes a calculated time constant (R1· (Csen+Cst2+Csw)) to be smaller than a 1 frame time and be sufficiently larger than a turn-on time (1 H) of one gate high signal. It serves to maintain a gate voltage value applied to the switching transistor (Tsw) 156 for more than the turn-on time of the gate voltage signal applied to the switching transistor (Tsw) 156, and thus to stably maintain touch recognition, when the switching transistor (Tsw) senses a touch, for at least the turn-on time of the switching transistor (Tsw) 156.

Here, Csw represents the capacitance between the gate electrode and a channel of the switching transistor 156, Cst2 represents the capacitance of the second storage capacitor 154, and Csen represents the capacitance of the sensing capacitor 155.

Second voltage (Vd2) applied to the second voltage line (L2) has a DC voltage value, which is not less than a regular positive voltage value, such that current flows in the switching transistor (Tsw) 156 when a high signal is applied to the gate line (Gn) 101. Accordingly, when a high signal is applied to the gate line (Gn) 101, the switching transistor (Tsw) 156 is operated, and current flowing in the switching transistor (Tsw) 156 is supplied to the read out line (ROIC) 115 and thus is sensed.

Here, the node A is connected to the gate line 101 through the resistance 157, and thus gate low voltage (Vgl) is applied to the node A. When the n-th gate line is turned on, the gate voltage applied to the n-th gate line is changed from the gate low voltage (Vgl) to the gate high voltage (Vgh), and at this time, the gate voltage (Vg_sw) of the switching transistor (Tsw) 156 is as follows.

$$V_{g\_sw} = \frac{C_{st2}}{C_{sen} + C_{st2} + C_{sw}}(V_{gh} - V_{gl}) + V_{gl}$$

Figure 4:
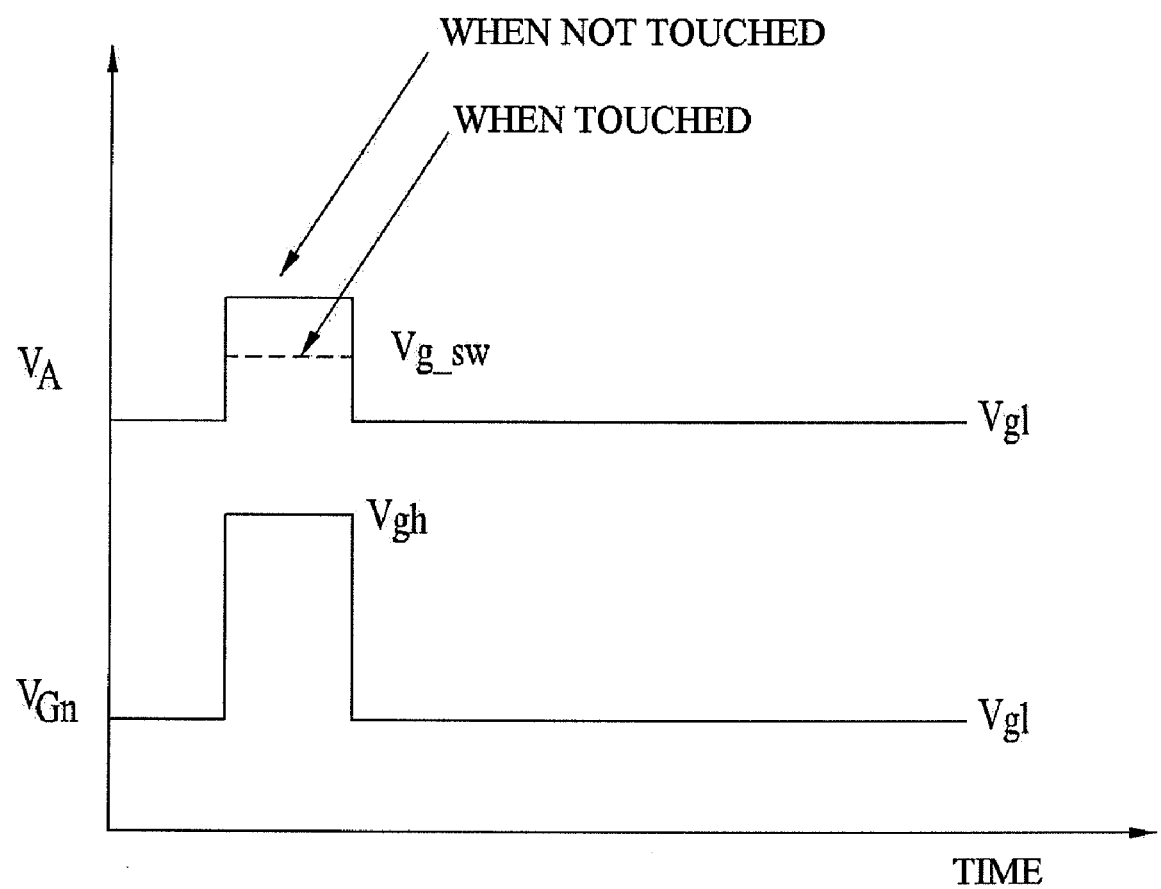
FIG. 4 is a graph illustrating timing of a variation in voltage, which is seen from a gate electrode and a node A, as time passes, in the liquid crystal display device in accordance with the embodiment of the present invention.

FIG. 4 is a graph illustrating timing of a variation in voltage, which is seen from a gate electrode and a node A, as time passes, in the liquid crystal display device in accordance with the present invention.

With reference to FIG. 4, when touched, a distance between the common electrode 203 and the node A at a touched region is reduced, and thus the capacitance (Csen) of the sensing capacitor 155 is increased and the gate voltage applied to the switching transistor (Tsw) 156 is decreased. Consequently, the current flowing in the read out line (ROIC) 115 is decreased.

Therefore, whether or not the device is touched or the position of the touched region can be determined from the current value flowing in the read out line (ROIC) 115 per unit time. That is, when the present current voltage is decreased compared with the current voltage at the initial stage prior to touched, it is determined that the device is touched, and when the present current voltage is similar to the current voltage at the initial stage, it is determined that the device is not touched. Positions of the touched region on the X-axis and the Y-axis are determined using the gate line and the read out line (ROIC), on which the sensing is performed.

Hereinafter, the liquid crystal display device with the touch sensing units in accordance with the present invention will be described in detail with reference to the accompanying drawings.

Figure 5:
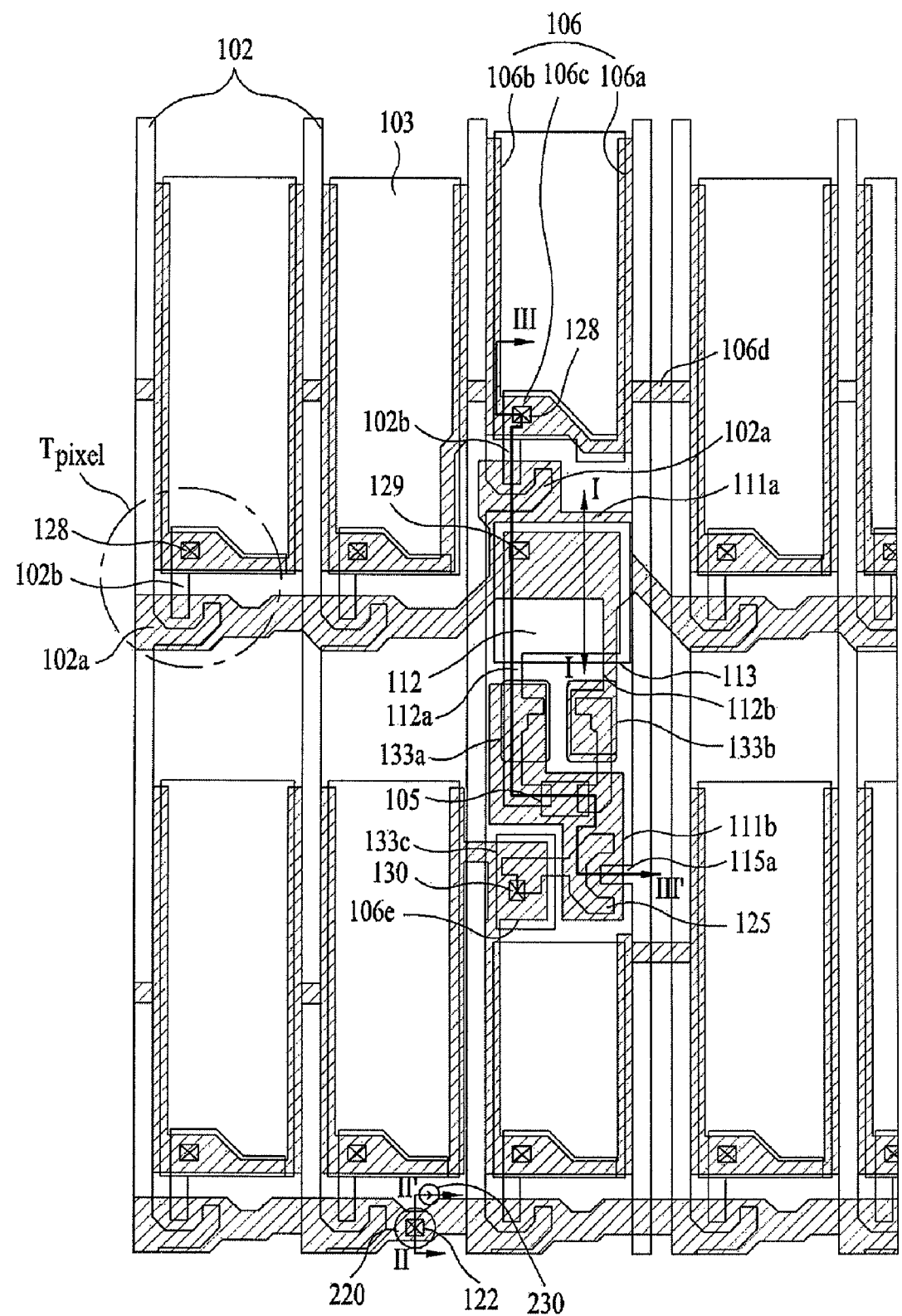
FIG. 5 is a plan view illustrating the liquid crystal display device in accordance with the embodiment of the present invention.
Figure 6:
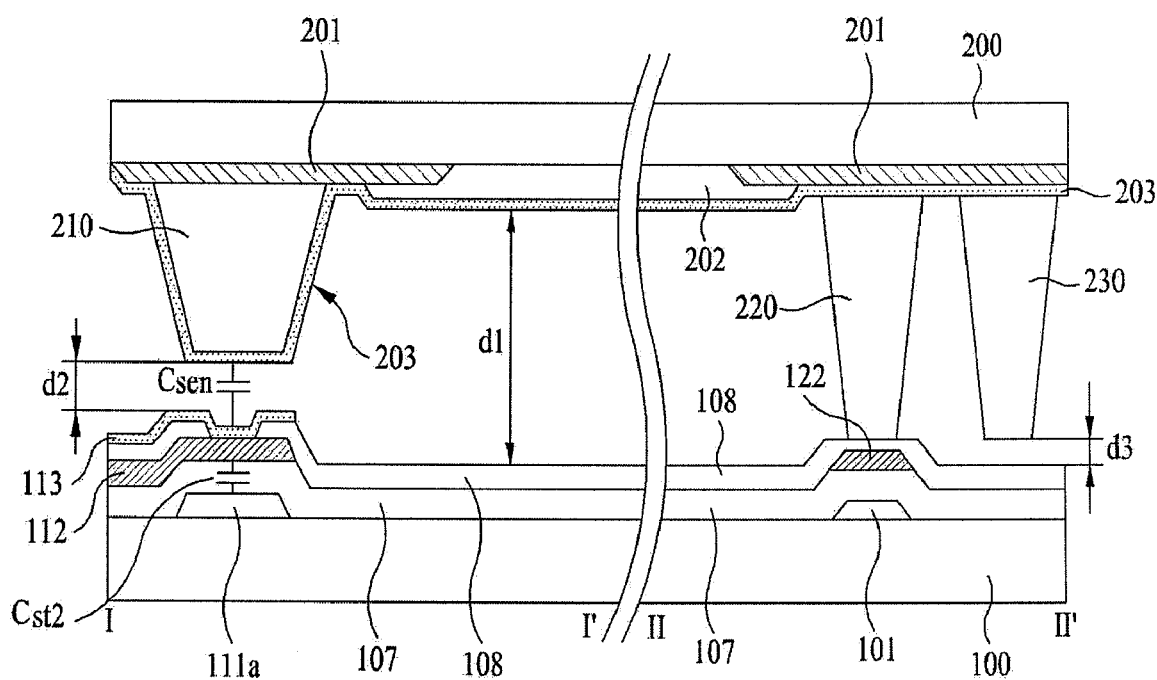
FIG. 6 is a longitudinal-sectional view of the liquid crystal display device, taken along the lines I-I' and II-II' of FIG. 5.
Figure 7:
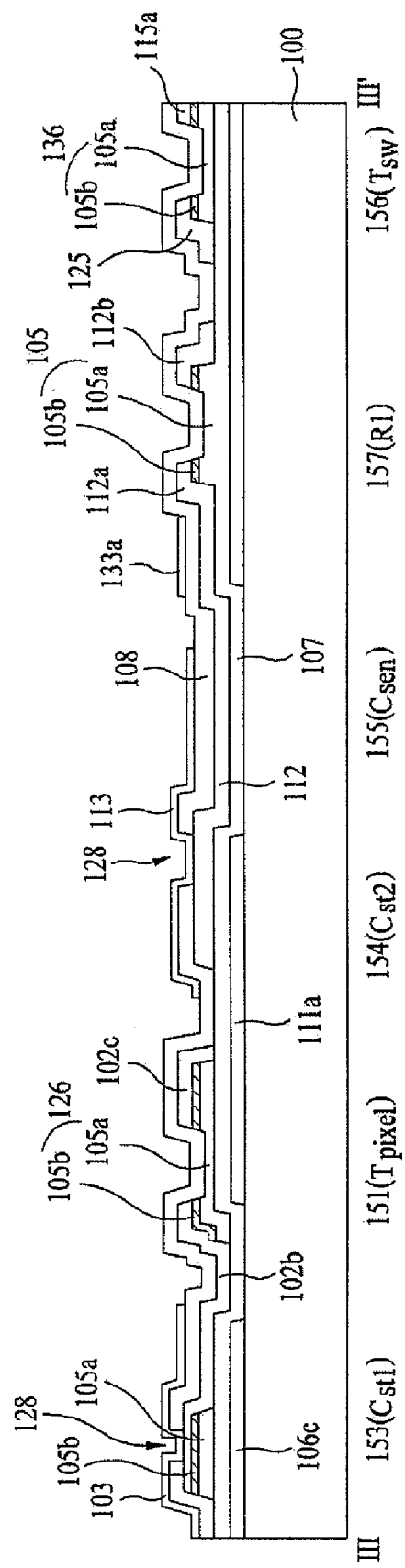
FIG. 7 is a longitudinal-sectional view of the liquid crystal display device, taken along the line III-III' of FIG. 5.

FIG. 5 is a plan view illustrating the liquid crystal display device in accordance with the present invention, FIG. 6 is a longitudinal-sectional view of the liquid crystal display device, taken along the lines I-I' and II-II' of FIG. 5, and FIG. 7 is a longitudinal-sectional view of the liquid crystal display device, taken along the line III-III' of FIG. 5.

As shown in FIGS. 5 to 7, in the liquid crystal display device of the present invention, the gate lines 101 and the data lines 102, which intersect each other to define the pixel regions, the pixel electrodes 103 formed in the pixel regions, and common lines 106 formed in a U shape in the peripheral parts of the pixel regions running parallel with the respective gate lines 101 according to the gate lines 101.

Here, each of the common lines 106 includes a U-shaped pattern 106a, 106b, and 106c formed in the peripheral part of the corresponding one of the pixel regions, and a connection pattern to connect the U-shaped pattern 106a, 106b, and 106c to the corresponding region of the data lines 102.

The pixel transistors (Tpixel) 151 are formed at the intersections of the gate lines 101 and the data lines 102, and the touch sensing units, each of which includes the second storage capacitor (Cst2) 154, the sensing capacitor (Csen) 155, the resistance (R1) 157, and the switching transistor (Tsw) 156, are formed between the same gate lines 101 and the common electrode 203, on which the second substrate 200 is located. In FIG. 6, a portion represented by the line III-III' illustrates the first storage capacitor 153, the pixel transistor 151, and the touch sensing unit including the second storage capacitor 154, the sensing capacitor 155, the resistance 157, and the switching transistor 156.

In this embodiment, as shown in FIG. 7, the storage capacitor (Cst2) 154 is defined between a first storage pattern 111a connected to the gate line 101 to have an area enlarged from the gate line 101, and a first pixel electrode pattern 133 partially overlapping the first storage pattern 111a. The first pixel electrode pattern 113 receives an electric signal via a first data metal pattern 112 contacting the lower surface of the first pixel electrode pattern 113

As shown in FIGS. 6 and 7, the sensing capacitor 155 has a capacitance value (Csen) varied according to a variation in thickness of the liquid crystal layer between the first pixel electrode pattern 113 and the common electrode 203 on the second substrate 200. FIG. 6 illustrates an auxiliary sensing pattern 210 additionally formed at a position corresponding to the sensing capacitor 155, and the auxiliary sensing pattern 210 is an optional pattern, which may be omitted. In this case, the capacitance (Csen) of the sensing capacitor 155 in the initial stage prior to touched may be increased such that a relative variation in capacitance when touched can be sensitively recognized.

Further, the resistance (R1) 157 includes a first resistance connection metal 112a extended from the first data metal pattern 112, a second resistance connection metal 112b separated from the first resistance connection metal 112a, and a semiconductor layer 105 respectively contacting the lower surfaces of the first and second resistance connection metals 112a and 112b to connect the first and second resistance connection metals 112a and 112b. The semiconductor layer 105 is obtained by stacking an amorphous silicon layer 105a and an impurity (ohmic contact) layer 105b, and the impurity layer 105b is selectively formed only on contact regions between the first and second resistance connection metals 112a and 112b and the semiconductor layer 105.

The switching transistor (Tsw) 156 includes a drain electrode 115a protruded from the read out line (ROIC) 115 formed parallel with the data line 102, a second data metal pattern 125 separated from the drain electrode 115a and formed in the same layer as the data line 102 to serve as a source electrode, and an electrode pattern 111b formed in the layer under the drain electrode 115a and the second data metal pattern 125 to serve as a gate electrode.

The electrode pattern 111b corresponds to the node A in the circuit diagram of FIG. 3, and the electrode pattern 111b electrically contacts the common line 106 and thus a common voltage signal applied to the common line 106 is applied to the electrode pattern 111b.

The first and second resistance connection metals 112a and 112b of the resistance 157 partially overlapping the upper surface of the electrode pattern 111b are connected to the node A, and the first resistance connection metal 112a is electrically connected to the first data metal pattern 112 and the first pixel electrode pattern 113 and thus is connected to one electrode of each of the sensing capacitor (Csen) 155 and the second storage capacitor (Cst2) 154.

The black matrix layer 201 corresponding to non-pixel regions and the color filter layer 202 corresponding to pixel regions are formed on the second substrate 200, and the common electrode 203 is formed on the entire surface of the second substrate 200 including the black matrix layer 201 and the color filter layer 202. Optionally, the auxiliary sensing pattern 210 may be further formed on the lower surface of the common electrode 203 at a position corresponding to the sensing capacitor (Csen) 155 of the touch sensing unit.

Further, first column spacers 220, which correspond to a portion of the upper surface of the black matrix layer 201 to support a cell gap (d1), and second column spacers 230, which correspond to another portion of the upper surface of the black matrix layer 201 to have a separation distance (d3) with the upper surface of the first substrate 100, are further provided on the upper surface of the common electrode 203. The separation distance (d3) between the second column spacers 230 and the upper surface of the first substrate 100 is an interval when the first and second substrates 100 and 200 are normally bonded, and allows the second column spacers 230 and the upper surface of the first substrate 100 to contact each other when a separate external pressure is applied. That is, the separation distance (d3) between the second column spacers 230 and the upper surface of the first substrate 100 is set to a value such that the second column spacers 230 are pushed down, when an applied specific external pressure is more than a designated value, to serve to exhibit a support function together with the first column spacers 220.

The cell gap (d1), the separation distance (d2) between the common electrode 203 on the upper surface of the auxiliary sensing pattern 210 and the first pixel electrode pattern 113, and the separation distance (d3) between the second column spacers 230 and the upper surface of the first substrate 100 satisfy the correlation of d1>d2>d3.

Further, the thickness of the auxiliary sensing pattern 210 is set to a value, which is smaller than a value obtained by subtracting a variation in the thickness ($\Delta d$) between the first and second substrate, which is maximally changed when touched, from the cell gap (d1) of the liquid crystal layer. It serves to prevent the common electrode 203 on the auxiliary sensing pattern 210 from contacting the first pixel electrode pattern 113, which is one electrode of the sensing capacitor (Csen) 155, when pressure is applied to the device.

Hereinafter, a method of manufacturing the liquid crystal display device in accordance with the present invention will be described in detail with reference to FIGS. 5 to 7.

The pixel regions disposed in a matrix shape are defined on the first substrate 100, which will be described below, and the touch sensing units corresponding to the boundaries of the pixel regions are respectively formed at intervals of n pixel regions.

First, the gate lines 101 disposed in one direction, the gate electrodes 101a protruded from the gate lines 101 for the respective pixel regions, the common lines 106 separated from the gate lines 101, formed in a U shape in the peripheral parts of the pixel regions running parallel with the respective gate lines 101, and connected to each other, the first storage pattern 111a protruded from the gate lines 101 corresponding to the touch sensing units, and the electrode pattern 111b separated from the first storage pattern 111a, provided with resistance forming parts, and serving as gate electrodes of the switching transistors (Tsw) 156 are formed by depositing a first metal on the first substrate 100 and then selectively removing the first metal. The electrode pattern 111b corresponds to the node A in the circuit of FIG. 3. Further, a common line protrusion pattern 106e adjoining the switching transistors (Tsw) 156, corresponding to the lower ends of the touch sensing units, and protruded from a part of each of the U-shaped common lines 106 is further formed.

Thereafter, a gate insulating film 107 is formed on the entire surface of the first substrate 100 including the gate lines 101, the gate electrodes 101a, the common lines 106, the first storage pattern 111a, and the electrode pattern 111b.

Thereafter, the semiconductor layer 105 is formed by depositing the amorphous silicon layer 105a and the impurity layer 105b on the entire surface of the gate insulating film 107 and selectively leaving the amorphous silicon layer 105a and the impurity layer 105b on designated regions on the gate electrodes 101a corresponding to regions for forming pixel transistors, regions corresponding to channel regions of the switching transistors (Tsw), regions for forming resistances, and channel regions of the pixel transistors.

Thereafter, the data lines 102 disposed in a direction to intersect the gate lines 101, and the read out line (ROIC) 115 running parallel with the data lines 102 and selectively passing through regions for forming the touch sensing units are formed by depositing a second metal on the gate insulating film 107 including the semiconductor layer 105 and then selectively removing the second metal. At this time, the source electrodes 102a of the pixel transistors, which are respectively protruded from the data lines 102, and the drain electrodes 102b of the pixel transistors, which are respectively separated from the source electrodes 102a, are formed. Further, the drain electrodes 115a of the switching transistors (Tsw), which are respectively protruded from the read out line (ROIC) 115, and the second data metal pattern 125 serving as the source electrodes of the switching transistors (Tsw), which are separated from the drain electrodes 115a, are formed. Further, the first data metal pattern 112, which adjoins the both data lines 102 of the touch sensing units and the rear out lines (ROIC) 115, partially overlaps the first storage pattern 11a, and is downwardly extended, the first resistance connection metal 112a connected to the first data metal pattern 112 and extended to a region for forming each of the resistances, and the second resistance connection metal 112b formed symmetrically with the first resistance connection metal 112a are formed in the same layer.

When the second data metal pattern 125 serving as the source electrodes of the switching transistors (Tsw) and the drain electrodes 115a of the switching transistors (Tsw) separated from the second data metal pattern 125 are formed, the impurity layer 105b under the region between the source and drain electrodes of the switching transistors (Tsw) is removed, thus defining a semiconductor layer 136 consisting of the amorphous silicon layer 105a and the impurity layer 105b, which are stacked. Here, semiconductor layers 126 and 105 are respectively formed in other regions (regions for forming the resistances and the pixel transistors) due to the patterned data metal.

The impurity layer 105b selectively contacts only regions corresponding to the source/drain electrodes 125 and 115a of the switching transistors (Tsw) and the source/drain electrodes 102a and 102b of the pixel transistors (Tpixel), and serves as an ohmic contact layer.

Thereafter, a passivation film 108 is formed on the entire surface of the first substrate 100 including the data lines 102, the read out line (ROIC) 115, the source/drain electrodes 125 and 115a of the switching transistors (Tsw), the source/drain electrodes 102a and 102b of the pixel transistors (Tpixel), the first and second data metal patterns 112 and 125, and the first and second resistance connection metals 112a and 112b.

Thereafter, first contact holes 128 to partially expose the drain electrodes 102 b of the pixel transistors (Tpixel), contact holes 129 to partially expose the first data metal pattern 112 on the first storage pattern 111a, third contact holes 130 to expose the common line protrusion pattern 106e obtained by partially removing the second data metal pattern 125 overlapping the upper surface of the common line protrusion pattern 106e and the gate insulating film 107 under the second data metal pattern 125, and fourth contact holes 131 to partially expose the first resistance connection metal 112a are formed by selectively removing the passivation film 108.

Thereafter, the pixel electrodes 103 filling the first contact holes 128 and corresponding to the respective pixel regions, the first pixel electrode pattern 113 filling the second contact holes 129 and overlapping the upper surface of the first data metal pattern 112, second pixel electrode pattern 123 filling the third contact holes 130 and overlapping the common line protrusion pattern 106e, and third and fourth pixel electrode patterns 113a and 113b respectively overlapping the first resistance connection metal 112a and the second resistance connection metal 112b are formed by depositing a transparent metal on the entire surface of the passivation film 108 including the first to fourth contact holes 128, 129, 130, and 131 and then selectively removing the transparent metal.

Figure 8:
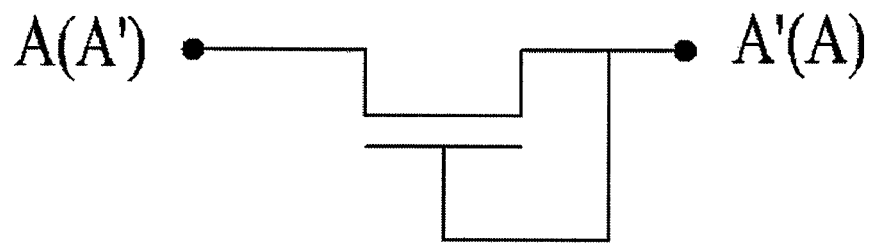
FIG. 8 is a schematic view illustrating a resistance formed in a diode type in accordance with another embodiment of the present invention.

FIG. 8 is a schematic view illustrating a resistance formed in a diode type in accordance with another embodiment of the present invention.

In FIG. 8, the resistance (R1) in the circuit diagram of FIG. 3 includes a thin film transistor, source and gate terminals of which are connected to serve as a diode. This thin film transistor is formed by the same method as the forming method of the pixel transistors or the switching transistors of FIGS. 5 to 7.

Figure 9:
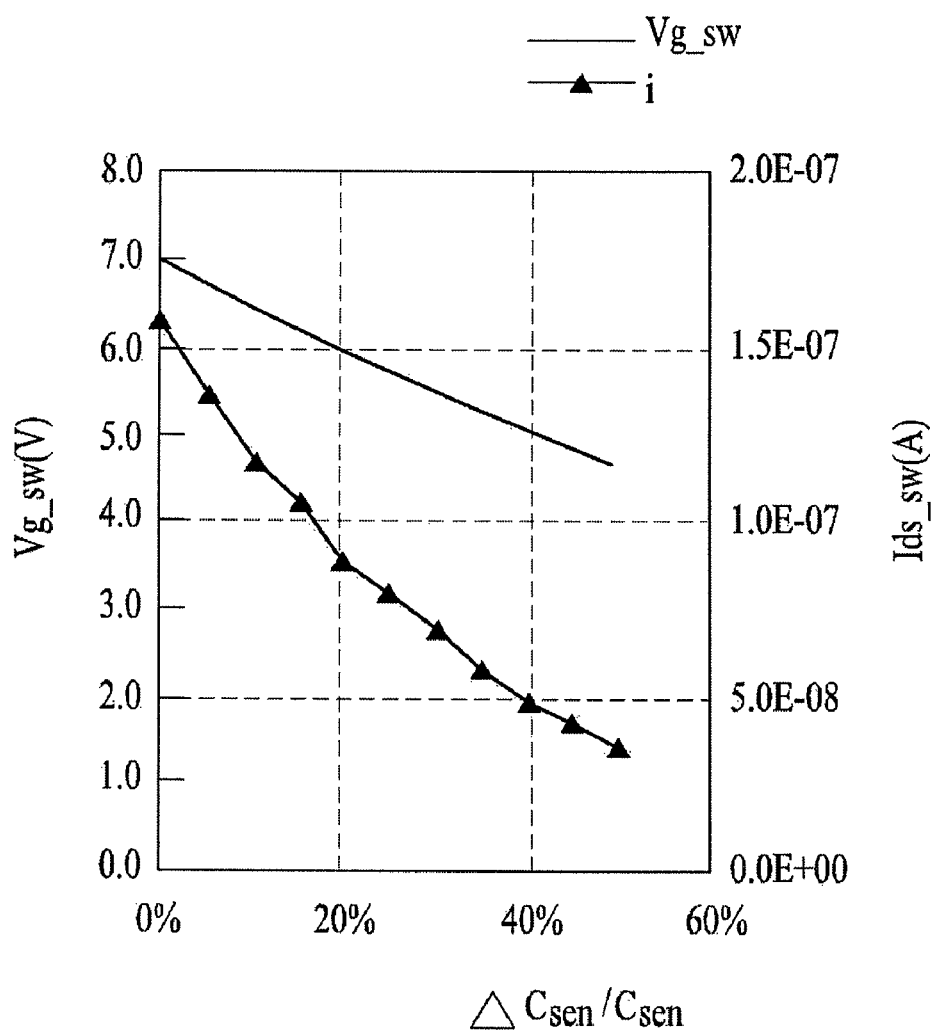
FIG. 9 is a graph illustrating a variation in the gate voltage and a variation in the drain current of a switching transistor according to a variation in the capacitance of a sensing capacitor in the liquid crystal display device in accordance with the embodiment of the present invention.

FIG. 9 is a graph illustrating a variation in the gate voltage and a variation in the drain current of the switching transistor according to a variation in the capacitance of the sensing capacitor in the liquid crystal display in accordance with the present invention.

The graph of FIG. 9 illustrates a variation in the gate voltage and a variation in the drain current of the switching transistor according to a variation ($\Delta$Csen) in the capacitance of the sensing capacitor in the liquid crystal display in accordance with the embodiment of the present invention.

The gate voltage (Vg_sw) and the drain current (Ids_sw) are varied according to a decreased degree of the interval between the common electrode 203 on the second substrate 200 and the first pixel electrode pattern 113 at the position of a touched region by a touch. Thus, when a degree of intensity of the touch is high, the interval between the common electrode 203 and the first pixel electrode pattern 113 is more decreased, and the varied values are increased. That is, when the capacitance of the sensing capacitor is increased, the gate voltage (Vg_sw) at the node A is decreased, as indicated in the solid line, and corresponds to the current value flowing in the drain terminal of the switching transistor, as indicated in the line passing through the triangular points in the graph.

In the graph, Csen denotes the capacitance value of the sensing capacitor in the initial state, in which the device is not touched.

In the liquid crystal display device having these touch sensing units, when the corresponding gate line is selectively turned on, the read out line of the corresponding touch sensing unit senses current. Although the read out line is provided only in the direction of the data lines, it is possible to sense positions of a touched region on the X-axis and the Y-axis by detecting which gate line senses the sensed current.

In the touch sensing units, a standard to determine whether or not the device is touched is parasitic capacitance of elements provided on the liquid crystal display device. For example, in case that a signal to noise (S/N) ratio is high, it is determined that the device is touched even when a variation ($\Delta$Csen) in the capacitance of the sensing capacitors has a low level of 10~20%, and in case that the S/N ratio is low, it is not determined that the device is touched until a variation ($\Delta$Csen) in the capacitance of the sensing capacitors has a high level of 20% or more. In the liquid crystal display device of the present invention, the constitutions of the touch sensing units and the read out line are optimized, and the parasitic capacitance is lowered and thus the S/N ratio of the panel is raised. Thus, it is possible to determine that the device is touched when a variation ($\Delta$Csen) in the capacitance of the sensing capacitors is approximately 10~20%.

The above-described liquid crystal display device of the present invention has effects, as follows.

First, compared with a conventional capacitance-type touch sensing liquid crystal display device provided with lines (read out lines) disposed in the directions of the X-axis and the Y-axis, the liquid crystal display device of the present invention is provided with the read out line disposed in the direction parallel with data lines, thus being capable of achieving optimization in structure and reducing parasitic capacitance between lines. Thereby, the liquid crystal display device in a large area is not much affected by the parasitic capacitance, thus being capable of stably sensing a touch.

Second, differing from a photo-type touch sensing liquid crystal display device affected by external light, the liquid crystal display device senses whether or not the device is touched and the position of a touched region by means of a variation in capacitance at the touched region, thus being capable of sensing a touch without the effects of external environment.

Third, the liquid crystal display device includes touch sensors formed integrally with a liquid crystal panel to sense a touch without the attachment of any separate touch panel, thus being capable of achieving the light-weight and thin-profile requirement, compared with a liquid crystal display device including sensors attached to the external surface thereof, and reducing production costs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
    a first substrate and a second substrate being opposite to each other;
    a plurality of gate lines and a plurality of data lines crossing each other on the first substrate to define pixel regions;
    pixel transistors respectively disposed at the intersections of the plurality of gate lines and the plurality of data lines, and pixel electrodes respectively disposed in the pixel regions;
    a common electrode disposed on the entire surface of the second substrate;
    a liquid crystal layer filling a gap between the first and second substrates;
    liquid crystal capacitors between the pixel electrodes and the common electrode;
    first storage capacitors disposed between the pixel electrodes and first storage electrodes on the first substrate;
    second storage capacitors and sensing capacitors disposed in series between the gate lines and the common electrode;
    a read out line being parallel with the data lines;
    switching transistors, each of which is provided with a gate electrode connected to a node between the second storage capacitor and the sensing capacitor, a drain electrode connected to the read out line, and a source electrode connected to a power voltage line; and
    an auxiliary sensing pattern disposed at a position under the common electrode corresponding to each of the sensing capacitors,
    wherein each of the second storage capacitors is defined by one of the gate lines, a data metal pattern overlapping the one of the gate lines, and an insulating film between the one of the gate lines and the data metal pattern; and
    wherein each of the sensing capacitors is defined by the data metal pattern, the common electrode, and the liquid crystal layer between the data metal pattern and the common electrode.

2. The liquid crystal display device according to claim 1, wherein the sensing capacitors have a capacitance value varied according to a variation in the thickness of the liquid crystal layer at a touched region.

3. The liquid crystal display device according to claim 1, further comprising resistances respectively connected to the second storage capacitors in parallel and respectively disposed between the gate lines and the gate electrodes of the switching transistors.

4. The liquid crystal display device according to claim 3, wherein a time constant defined by a resistance value of the resistance and capacitance values of the second storage capacitors, the sensing capacitors, and the switching capacitors is smaller than a 1 frame time and is larger than a turn-on time of a gate high signal applied to the gate lines.

5. The liquid crystal display device according to claim 1, wherein each of the first storage electrodes includes a common line separated from each of the gate lines and disposed in the peripheral part of each of the pixel regions being parallel with the respective gate lines.

6. The liquid crystal display device according to claim 5, wherein the power voltage line, to which the source electrode of each of the switching transistors is connected, is the common line.

7. The liquid crystal display device according to claim 1, wherein the thickness of the auxiliary sensing pattern is smaller than a value obtained by subtracting a variation in the thickness between the first and second substrate, which is maximally changed when touched, from the cell gap of the liquid crystal layer.

* * * * *